(12) United States Patent
Koradhanyamath et al.

(10) Patent No.: US 12,688,046 B2
(45) Date of Patent: Jul. 21, 2026

(54) BIOS/BMC INITIALIZATION COMMUNICATION SYSTEM

(71) Applicant: Dell Products L.P., Round Rock, TX (US)

(72) Inventors: Sangamesh Koradhanyamath, Bengaluru (IN); Nagaraj Annenavar, Bengaluru (IN); Swapan Kumar Bhakat, Jaduguda (IN); Adithya Mundigemane Shankaranarayana, Chickmagalur (IN)

(73) Assignee: Dell Products L.P., Round Rock, TX (US)

( * ) Notice: Subject to any disclaimer, the term of this patent is extended or adjusted under 35 U.S.C. 154(b) by 99 days.

(21) Appl. No.: 18/937,206

(22) Filed: Nov. 5, 2024

(65) Prior Publication Data

US 2026/0127005 A1 May 7, 2026

(51) Int. Cl.
*G06F 9/44* (2018.01)
*G06F 9/4401* (2018.01)

(52) U.S. Cl.
CPC .................................. *G06F 9/4401* (2013.01)

(58) Field of Classification Search
CPC ..................................... G06F 1/32; G06F 9/44
See application file for complete search history.

(56) References Cited

U.S. PATENT DOCUMENTS

| | | | |
|---|---|---|---|
| 10,564,872 B2 | 2/2020 | Benisty | |
| 2017/0068548 A1* | 3/2017 | Dasar | G06F 9/4401 |
| 2025/0225094 A1* | 7/2025 | Ni | G06F 13/385 |

* cited by examiner

*Primary Examiner* — Keshab R Pandey
(74) *Attorney, Agent, or Firm* — Joseph Mencher

(57) ABSTRACT

A BIOS/BMC initialization communication system includes a storage device having a controller memory buffer device, a BMC device coupled to the storage device, and a BIOS coupled to the storage device. During initialization operations, the BIOS configures the controller memory buffer device for BIOS/BMC communications, and transmits controller memory buffer device utilization information for the controller memory buffer device to the BMC device. The BIOS may then communicate with the BMC device during initialization operations by providing a BMC command in the controller memory buffer device, determining that the BMC device has provided a BMC response in the controller memory buffer device, and retrieving the BMC response. Similarly, the BMC device may communicate with the BIOS during initialization operations by providing a BIOS command in the controller memory buffer device, determining that the BIOS has provided a BIOS response in the controller memory buffer device, and retrieving the BIOS response.

20 Claims, 17 Drawing Sheets

202

BMC DEVICE 206

BMC ENGINE 206a

500

BIOS 204

BIOS ENGINE 204a

CMB DEVICE 208a

NVME DEVICE 208

CMB DEVICE 210a

NVME DEVICE 210

CMB DEVICE 212a

NVME DEVICE 212

COMPUTING DEVICE 200

BIOS/BMC INITIALIZATION COMMUNICATION SYSTEM

BACKGROUND

The present disclosure relates generally to information handling systems, and more particularly to communication between a Basic Input/Output System (BIOS) and a Baseboard Management Controller (BMC) device during initialization of an information handlings system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, often include a Baseboard Management Controller (BMC) such as the integrated DELL® Remote Access Controller (iDRAC) provided in server devices available from DELL® Inc. of Round Rock, Texas, United States. During initialization of such server devices, the BMC may communicate with a Basic Input/Output System (BIOS) in the server device, and conventional BMCs in conventional server devices include a Peripheral Component Interconnect express (PCIe) BMC Interface (PBI) communication subsystem for use in performing such initialization communications. However, PBI communication subsystems suffer from a number of issues. For example, PBI communication subsystems includes a relatively limited memory buffer capacity of 16 KB that often requires multiple sequential initialization communication transactions for relatively large data packets, which introduces an initialization communications bottleneck that impacts the time required to initialize the server device (an impact that will increase as the amount of server device platform/system management data communicated during initialization increases). Furthermore, the BMC must be available for its PBI communication subsystems to be used. Further still, PBI communication subsystems are relatively "tightly bound" to their server device platforms (e.g., to the hardware in the BMC), thus requiring the source code of the BIOS to be changed in each server device platform generation in order to allow it to use the PBI communication subsystem.

Accordingly, it would be desirable to provide a BIOS/BMC initialization communication system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) engine that is configured, during initialization operations, to: configure, for BIOS/BMC communications, a controller memory buffer device in a storage device that is coupled to the processing system; transmit controller memory buffer device utilization information for the controller memory buffer device to a BMC device that is coupled to the processing system; provide, in the controller memory buffer device, a BMC command; determine that the BMC device has provided a BMC response to the BMC command in the controller memory buffer device; and retrieve, in response to determining that the BMC device has provided the BMC response to the BMC command in the controller memory buffer device, the BMC response.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
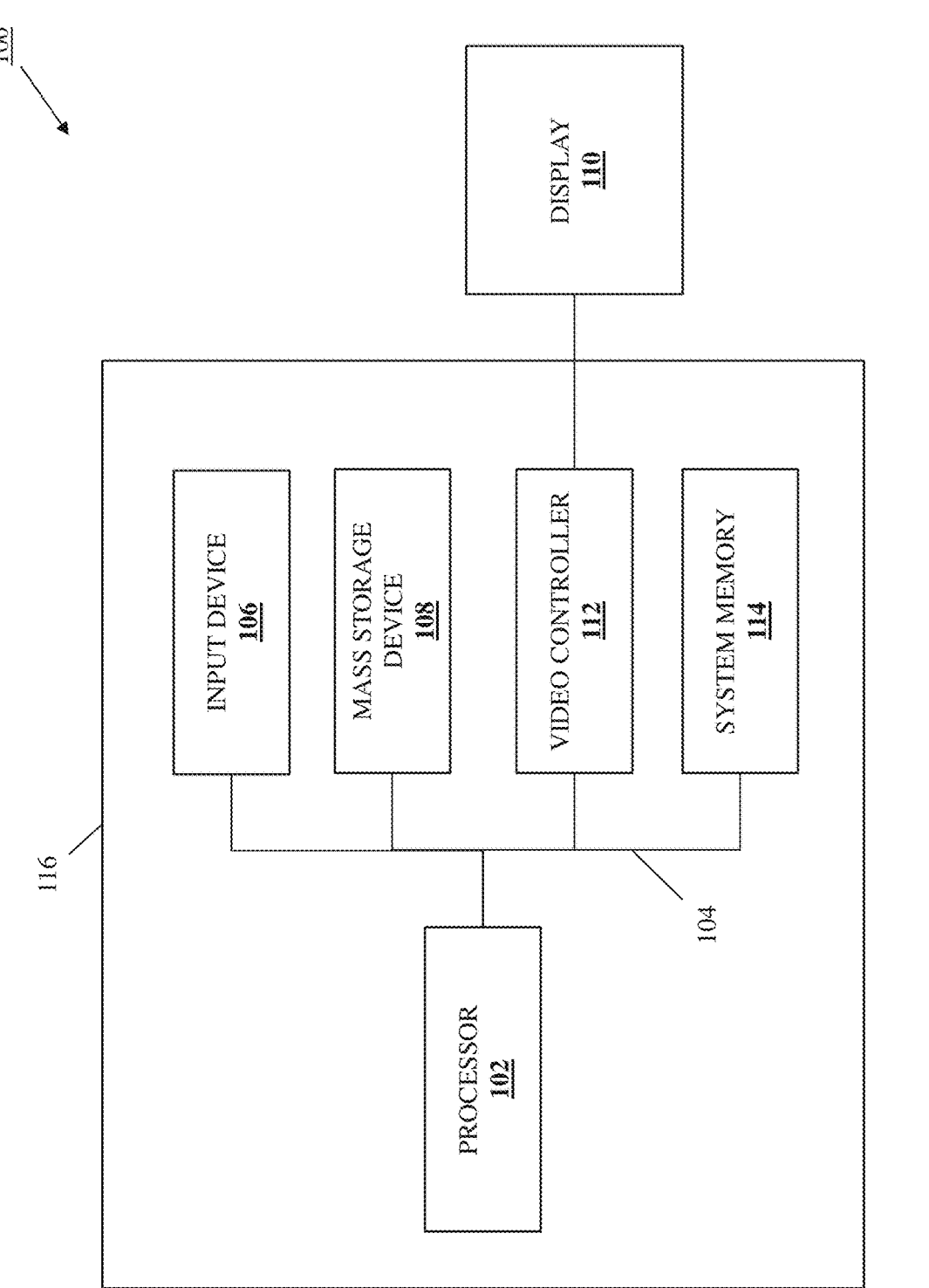
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
FIG. 2 is a schematic view illustrating an embodiment of a computing device that may include the BIOS/BMC initialization communication system of the present disclosure.

Referring now to FIG. 2, an embodiment of a computing device 200 is illustrated that may include the BIOS/BMC initialization communication system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other computing devices that are configured to operate similarly as the computing device 200 discussed below.

In the illustrated embodiment, the computing device 200 includes a chassis 202 that houses the components of the computing device 200, only some of which are illustrated and described below. For example, the chassis 202 may house a Basic Input/Output System (BIOS) 204 that one of skill in the art in possession of the present disclosure will appreciate may be provided by firmware that is configured to perform hardware initialization during boot operations (e.g., Power-On STartup (POST)) and/or other initialization operations for the computing device 200, runtime services for operating systems and applications provided on the computing device 200, and/or other conventional BIOS operations known in the art.

The BIOS 204 may include a BIOS processing system (not illustrated, but which may include the processor 102 discussed above with reference to FIG. 1 such as, for example, a Central Processing Unit (CPU)) and a BIOS memory system (not illustrated, but which may include the memory 114 discussed above with reference to FIG. 1 such as, for example, Dynamic Random Access Memory (DRAM)) that is coupled to the BIOS processing system and that includes instructions that, when executed by the BIOS processing system, cause the BIOS processing system to provide a BIOS engine 204a that is configured to perform the functionality of the BIOS engines, BIOS, and/or computing devices discussed below. In a specific example, the BIOS engine 204a may be provided by a system management driver included in the BIOS 204, although other BIOS engines are envisioned as falling within the scope of the present disclosure as well.

The chassis 202 may also house a Baseboard Management Controller (BMC) device 206 that one of skill in the art in possession of the present disclosure will recognize may provide an out-of-band management platform for the computing device 200 (using mostly separate resources from the computing device 200) via a browser-based interface or Command Line Interface (CLI) that enables management and monitoring of hardware in the computing device 200. In a specific example, the BMC device 208 may be provided by an integrated DELL® Remote Access Controller (iDRAC) available in computing devices available from DELL® Inc. of Round Rock, Texas, United States, although other BMC devices will fall within the scope of the present disclosure as well.

The BMC device 206 may include a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide a BMC engine 204 that is configured to perform the functionality of the BMC engines, BMC devices, and/or computing devices discussed below. As illustrated, the BMC device 206 may be coupled to the BIOS 204 via multiple communication subsystems that are described below as being provided by a PCIe BMC Interface (PBI) communication subsystem and an Intelligent Platform Management Interface (IPMI) communication subsystem in the specific examples provided below, but that may be provided by other communication subsystems while remaining within the scope of the present disclosure as well.

The chassis 202 may also house a storage system including at least one storage device that, in the illustrated example, is provided by a plurality of Non-Volatile Memory express (NVMe) devices 208, 210, and up to 212 that are each coupled to the BIOS 204 and the BMC device 206, but that one of skill in the art in possession of the present disclosure will appreciate may be provided by other types of storage devices while remaining within the scope of the present disclosure as well. For example, the BIOS 204 may be coupled to each of the NVMe devices 208-212 via a PCIe bus or other PCIe connections, and the BMC device 206 may be coupled to each of the NVMe devices 208-212 by an NVMe Management Interface (NVMe-MI) out-of-band connection, although other connections will fall within the scope of the present disclosure as well.

As illustrated, each of the NVMe devices 208, 210, and up to 212 may include a respective Controller Memory Buffer (CMB) device 208a, 210a, and up to 212a. However, while a specific computing device 200 has been illustrated and described, one of skill in the art in possession of the present disclosure will recognize that computing devices (or other devices operating according to the teachings of the present disclosure in a manner similar to that described below for the computing device 200) that provide the BIOS/BMC initialization communication system of the present disclosure may include a variety of components and/or component configurations for providing conventional computing device functionality, as well as the BIOS/BMC initialization communication functionality discussed below, while remaining within the scope of the present disclosure as well.

Figure 3:
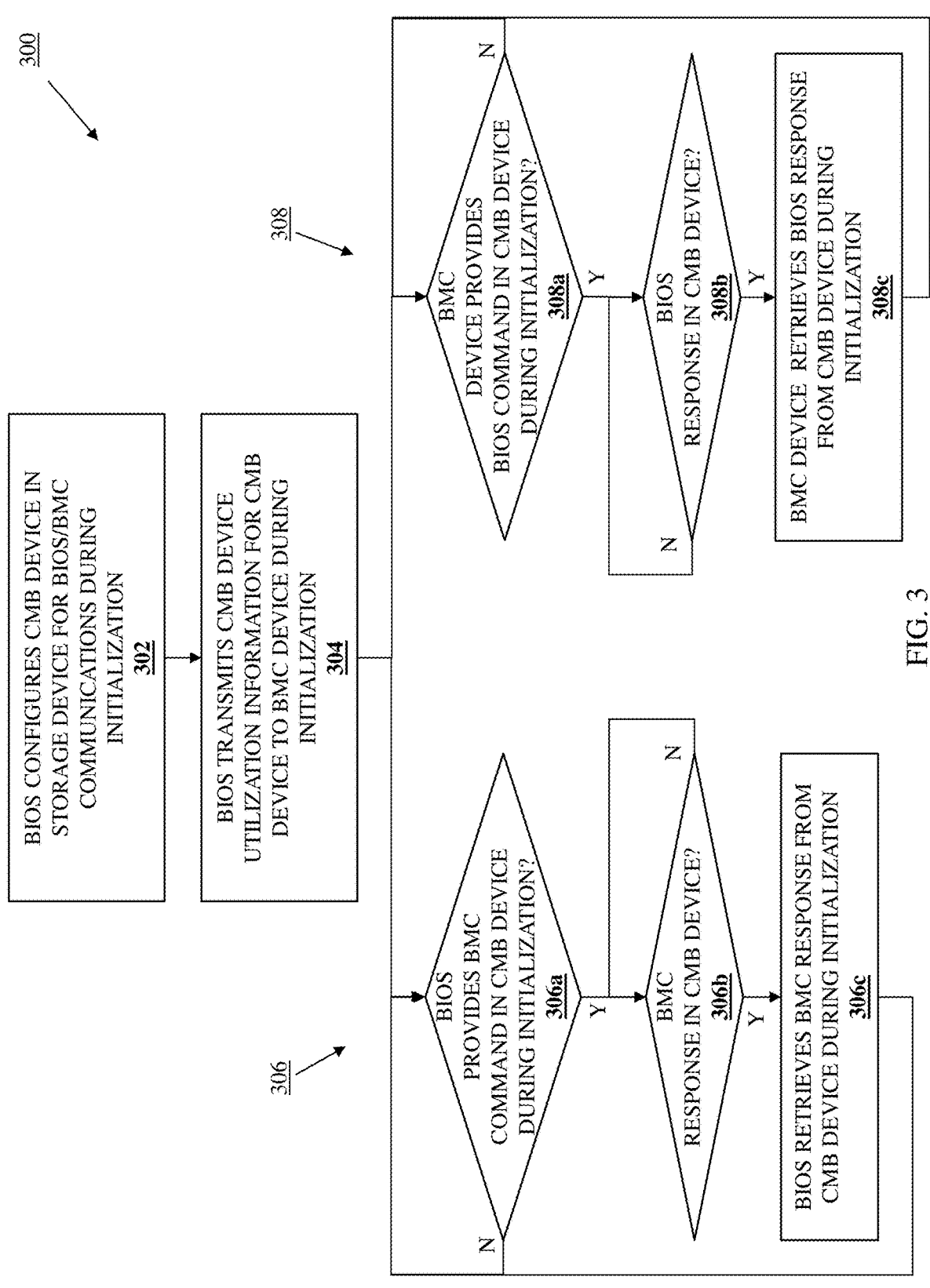
FIG. 3 is a flow chart illustrating an embodiment of a method for BIOS/BMC communication during initialization of a computing device.

Referring now to FIG. 3, an embodiment of a method 300 for Basic Input/Output System (BIOS)/Baseboard Management Controller (BMC) communication during initialization of a computing device is illustrated. As discussed below, the systems and methods of the present disclosure enable communications between a BIOS and a BMC device in a computing device during its initialization using a controller memory buffer device in a storage device in that computing device. For example, the BIOS/BMC initialization communication system of the present disclosure may include a storage device having a controller memory buffer device, a BMC device coupled to the storage device, and a BIOS coupled to the storage device. During initialization operations, the BIOS configures the controller memory buffer device for BIOS/BMC communications, and transmits controller memory buffer device utilization information for the controller memory buffer device to the BMC device. The BIOS may then communicate with the BMC device during initialization operations by providing a BMC command in the controller memory buffer device, determining that the BMC device has provided a BMC response in the controller memory buffer device, and retrieving the BMC response. Similarly, the BMC device may communicate with the BIOS during initialization operations by providing a BIOS command in the controller memory buffer device, determining that the BIOS has provided a BIOS response in the controller memory buffer device, and retrieving the BIOS response. As such, the issues with conventional initialization communications via the PBI communication subsystem in the BMC device of a computing device discussed above are eliminated.

Figure 4:
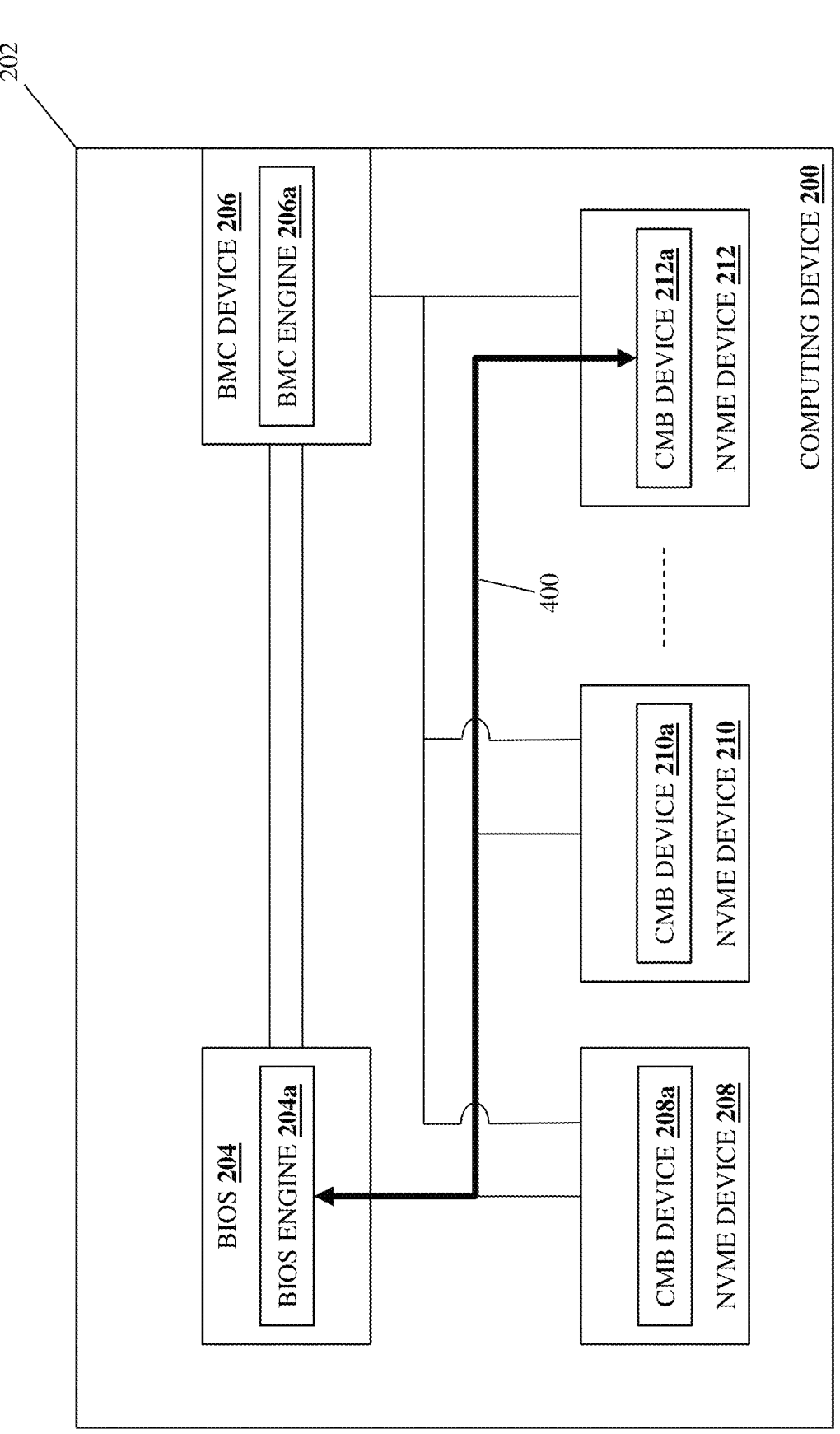
FIG. 4 is a schematic view illustrating an embodiment of the computing device of FIG. 2 operating during the method of FIG. 3.

The method 300 begins at block 302 where a BIOS configures a CMB device in a storage device for BIOS/BMC communications during initialization. With reference to FIG. 4, in an embodiment of block 302, the computing device 200 may be powered on, booted, reset, rebooted, and/or otherwise be initialized such that the BIOS 204 begins hardware initialization (e.g., during POST) and/or other initialization operations known in the art. In a specific example, during the initialization of the computing device 200 and as part of those initialization operations, the BIOS engine 204a in the BIOS 204 may perform CMB device configuration operations 400 that include configuring the CMB device 212a in the NVMe device 212 for use in performing the BIOS/BMC initialization communications described below. As will be appreciated by one of skill in the art in possession of the present disclosure, while the configuration of the CMB device 212a in the NVMe device 212 for use in performing BIOS/BMC initialization communications is described herein, any of the CMB devices in any of the NVMe devices in the computing device 200 (e.g., the CMB device 208a in the NVMe device 208 and/or the CMB device 210a in the NVMe device 210) may be configured similarly as described below for the CMB device 212a in the CMB device 212. Furthermore, while only a single CMB device is illustrated and described in detail as being configured during the method 300, as described below multiple CMB devices may be configured for use in providing redundancy, failover, and/or other benefits in the BIOS/BMC initialization communications as well.

In an embodiment, the CMB device configuration operations 400 may include the BIOS engine 204a setting a register for the CMB device 212a to indicate an intent to use the CMB device 212a for BIOS/BMC initialization communications (e.g., setting a "CMBMSC.CRE" register for the CMB device 212a to "1"). Furthermore, the CMB device configuration operations 400 may also include the BIOS engine 204a configuring submission/completion queue pairs in the CMB device 212a. In the examples described below, the BIOS engine 204a may configure a BIOS/BMC submission queue that is configured to store the BMC requests provided by the BIOS engine 204a described below, and a BIOS/BMC completion queue that is configured to store the BMC responses provided by the BMC engine 206a described below, with the BIOS/BMC submission queue and BIOS/BMC completion queue each including respective head/tail pointer structures. In another example, the BIOS engine 204a may configure a BMC/BIOS submission queue that is configured to store the BIOS requests provided by the BMC engine 206a described below, and a BMC/BIOS completion queue that is configured to store the BIOS responses provided by the BIOS engine 204a described below, with the BMC/BIOS submission queue and BMC/BIOS completion queue each including respective head/tail pointer structures.

In some embodiments, as part of the CMB device configuration operations 400, the BIOS engine 204a may identify a location of the CMB device 212a (e.g., a CMB "offset" in a "CMBLOC" register in the controller of the NVMe device 212), a size of the CMB device 212a (e.g., a CMB storage capacity in a "CMBSZ" register in the controller of the NVMe device 212), and/or any other CMB properties that would be apparent to one of skill in the art in possession of the present disclosure. However, while a few specific examples of CMB device configuration operations have been described, one of skill in the art in possession of the present disclosure will appreciate how the CMB device in a storage device may be configured for use in the BIOS/BMC initialization communications described herein using a variety of techniques that will fall within the scope of the present disclosure as well.

Figure 5:
FIG. 5 is a schematic view illustrating an embodiment of the computing device of FIG. 2 operating during the method of FIG. 3.

The method 300 then proceeds to block 304 where the BIOS transmits CMB device utilization information for the CMB device to a BMC device during initialization. With reference to FIG. 5, in an embodiment of block 304, the BIOS engine 204a in the BIOS 204 may perform CMB utilization information transmission operations 500 that may include transmitting any of the CMB properties identified at block 302 to the BMC engine 206a in the BMC device 206. In a specific example, the CMB utilization information transmission operations 500 may include the BIOS engine 204a transmitting the location of the CMB device 212a (e.g., the CMB "offset" of the CMB device 212a retrieved by the BIOS engine 204a as described above) to the BMC engine 206a via the IPMI communication subsystem discussed above, although the transmission of other CMB utilization information and/or the use of other communication subsystems to transmit CMB utilization information will fall within the scope of the present disclosure as well.

Following the configuration of the CMB device for BIOS/ BMC initialization communications at block 302 and the transmission the CMB device utilization information to the BMC device at block 304, the method 300 may then proceed to each of a loop 306 where the BIOS may initiate communications with the BMC device, and a loop 308 where the BMC device may initiates communication with the BIOS, and as discussed below the loop 306 may continue until initialization of the computing device is completed, while the loop 308 may continue following initialization of the computing device and into runtime of the computing device 200.

With reference first to loop 306, the method 300 may proceed to decision block 306a where the method 300 proceeds depending on whether the BIOS provides a BMC command in the CMB device during initialization. As discussed below, the BIOS engine 204a in the BIOS 204 may initiate communications with the BMC device 206 by generating a BMC command (e.g., a read command directed to the BMC device 206, a write command directed to the BMC device 206, etc.), and providing that BMC command in the CMB device 212a of the NVMe device 212. As such, decision block 306a will proceed depending on whether the BIOS engine 204a provides a BMC command in the CMB device 212a. If, at decision block 306a, the BIOS does not provide a BMC command in the CMB device during initialization, loop 306 of the method 300 returns to decision block 306a. As such, loop 306 of the method 300 may loop until the BIOS engine 204a provides a BMC command in the CMB device 212a.

Figure 6A:
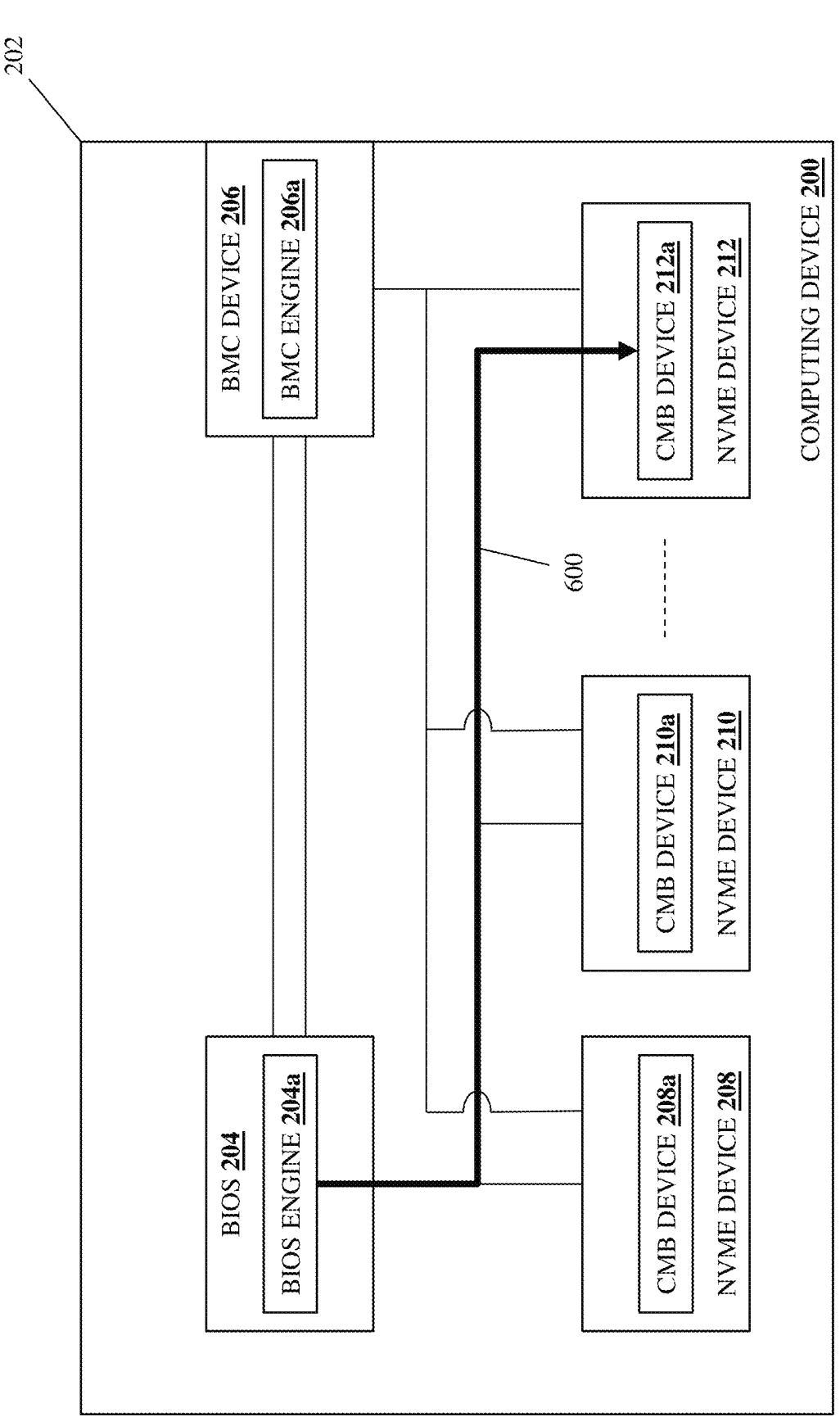
FIG. 6A is a schematic view illustrating an embodiment of the computing device of FIG. 2 operating during the method of FIG. 3.

Continuing with loop 306 of the method 300, if at decision block 306a the BIOS provides a BMC command in the CMB device during initialization, the method 300 proceeds to decision block 306b where the BIOS determines whether a BMC response has been provided in the CMB device. With reference to FIG. 6A, in an embodiment of decision block 306a, the BIOS engine 204a in the BIOS 204 may perform BMC command provisioning operations 600 that include generating the BMC command (e.g., the read command directed to the BMC device 206, the write command directed to the BMC device 206, etc.) discussed above, and providing that BMC command in the CMB device 212a of the NVMe device 212 as described above.

For example, the provisioning of the BMC command in the CMB device 212a by the BIOS engine 204a may include the BIOS engine 204a writing the BMC command to the BIOS/BMC submission queue in the CMB device 212a, updating a header in the CMB device 212a to identify that the BMC command has been written to the CMB device

212a, incrementing a tail portion of the head/tail pointer structure for the BIOS/BMC submission queue (e.g., from "0/0" to "0/1"), and/or performing any other command provisioning operations that would be apparent to one of skill in the art in possession of the present disclosure. While not described herein in detail, one of skill in the art in possession of the present disclosure will appreciate how the BIOS engine 204a may provide the BMC command in the CMB device 212a with authentication information (e.g., a signature or other authentication information known in the art) that may be authenticated by the BMC engine 206a in order to ensure to the BMC engine 206a that the BMC command is from a trusted entity.

Figure 6B:
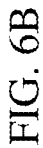
FIG. 6B is a schematic view illustrating an embodiment of the computing device of FIG. 2 operating during the method of FIG. 3.

With reference to FIG. 6B, the BMC engine 206a in the BMC device 206 may be configured to perform BMC polling operations 602 that include periodically accessing the CMB device 212a in the NVMe device 212 to determine whether a BMC command has been provided in the CMB device 212a (e.g., accessing the header of the CMB device 212a to determine whether an indication of a BMC command has been provided therein), and one of skill in the art in possession of the present disclosure will appreciate how the BMC engine 206a may be configured to periodically perform the BMC polling operations 602 at any frequency known in the art. Furthermore, one of skill in the art in possession of the present disclosure will appreciate how the BMC polling operations 602 may be performed by the BMC engine 206a throughout the method 300. As such, BMC polling operations 602 by the BMC engine 206a that follow the provisioning of the BMC command in the CMB device 212a will result in the BMC engine 206a determining that the indication of the BMC command has been provided in the header of the CMB device 212a by the BIOS engine 204a as described above.

Figure 6C:
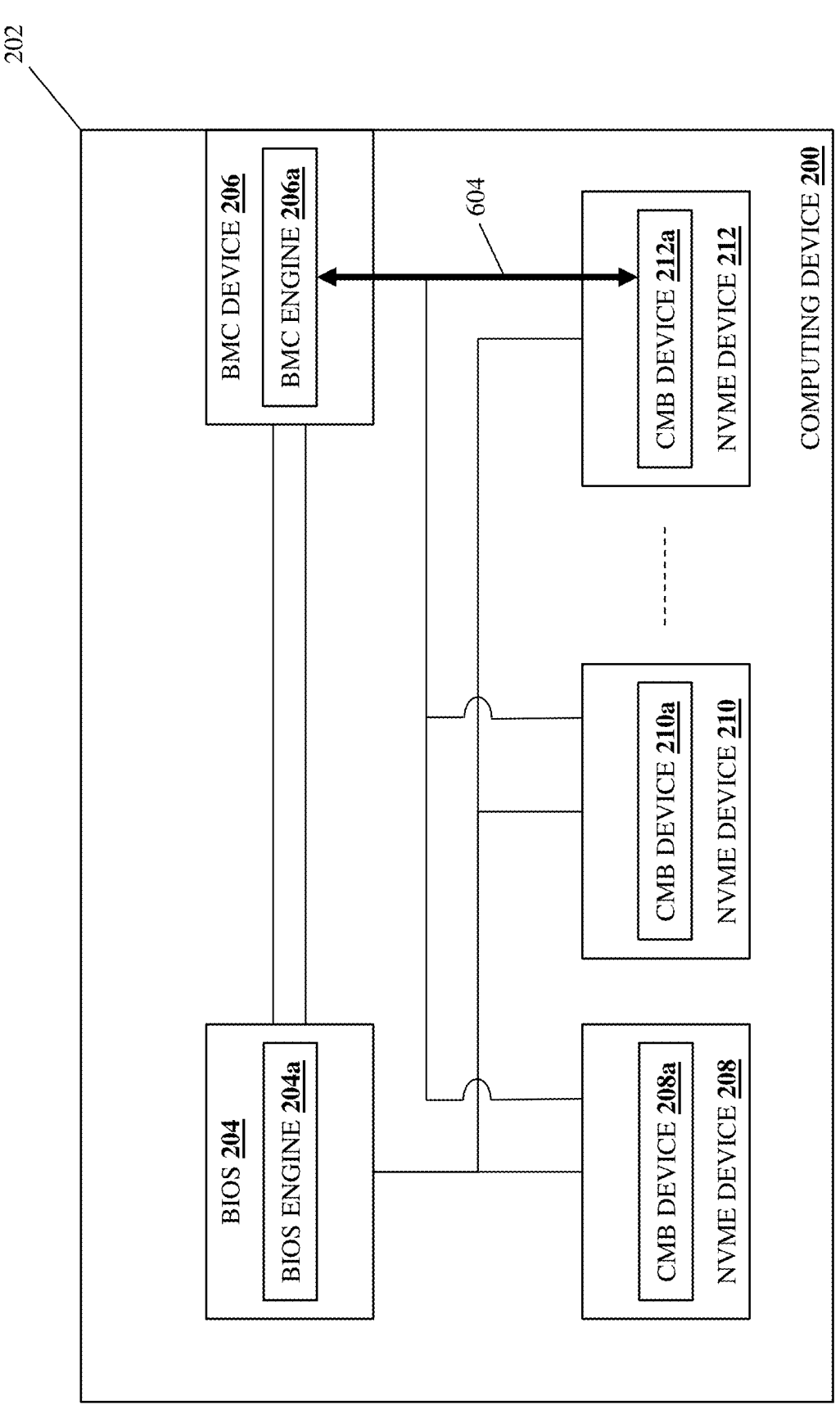
FIG. 6C is a schematic view illustrating an embodiment of the computing device of FIG. 2 operating during the method of FIG. 3.
Figure 6D:
FIG. 6D is a schematic view illustrating an embodiment of the computing device of FIG. 2 operating during the method of FIG. 3.

With reference to FIG. 6C, in response determining that the indication of the BMC command has been provided in the header of the CMB device 204a, the BMC engine 206a may perform command retrieval operations 604 that include accessing the head/tail pointer structure for the BIOS/BMC submission queue in the CMB device 212a and determining that the tail portion of the head/tail pointer structure for the BIOS/BMC submission queue is greater than the head portion (e.g., the tail portion is "1" while the head portion is "0" as described above). In response to determining that the tail portion of the head/tail pointer structure for the BIOS/ BMC submission queue is greater than the head portion, the BMC engine 206a may retrieve the BMC command from the CMB device 212a, authenticate that BMC command, and increment a head portion of the head/tail pointer structure for the BIOS/BMC submission queue (e.g., from "0/1" to "1/1"). With reference to FIG. 6D, in response to retrieving the BMC command from the CMB device 212a in the NVMe device 212, the BMC engine 206a in the BMC device 206 may perform response provisioning operations 606 that include generating a BMC response to the BMC command, and providing that BMC response in the CMB device 212a.

In examples in which the BMC command is a read command, the response provisioning operations 606 performed by the BMC engine 206a in the BMC device 206 may include reading data requested in that read command from a memory device, storage device, and/or other data structure accessible to the BMC engine 206a, generating a BMC response that includes that data, and providing that BMC response in the CMB device 212a. Similarly as described above for the BMC command, the provisioning of the BMC response in the CMB device 212a may include the BMC engine 206a writing the BMC response (including the data requested by the BIOS engine 204a and read by the BMC engine 206a as described above) to the BIOS/BMC completion queue in the CMB device 212a, updating a header in the CMB device 212a to identify that the BMC response has been written to the CMB device 212a, incrementing a tail portion of the head/tail pointer structure for the BIOS/BMC completion queue (e.g., from "0/0" to "0/1"), and/or any other response provisioning operations that would be apparent to one of skill in the art in possession of the present disclosure. While not described herein in detail, one of skill in the art in possession of the present disclosure will appreciate how the BMC engine 206a may provide the BMC response in the CMB device 212a with authentication information (e.g., a signature or other authentication information known in the art) that may be authenticated by the BIOS engine 204a in order to ensure to the BIOS engine 204a that the BMC response is from a trusted entity.

In examples in which the BMC command is a write command, the response provisioning operations 606 performed by the BMC engine 206a in the BMC device 206 may include writing data provided in that write command to a memory device, storage device, and/or other data structure accessible to the BMC engine 206a, generating a BMC response that includes a confirmation that data has been written, and providing that BMC response in the CMB device 212a. Similarly as described above for the BMC command, the provisioning of the BMC response in the CMB device 212a may include the BMC engine 206a writing the BMC response (including the confirmation that the data provided by the BIOS engine 204a was written by the BMC engine 206a as described above) to the BIOS/BMC completion queue in the CMB device 212a, updating a header in the CMB device 212a to identify that the BMC response has been written to the CMB device 212a, incrementing a tail portion of the head/tail pointer structure for the BIOS/BMC completion queue (e.g., from "0/0" to "0/1"), and/or any other response provisioning operations that would be apparent to one of skill in the art in possession of the present disclosure.

Figure 6E:
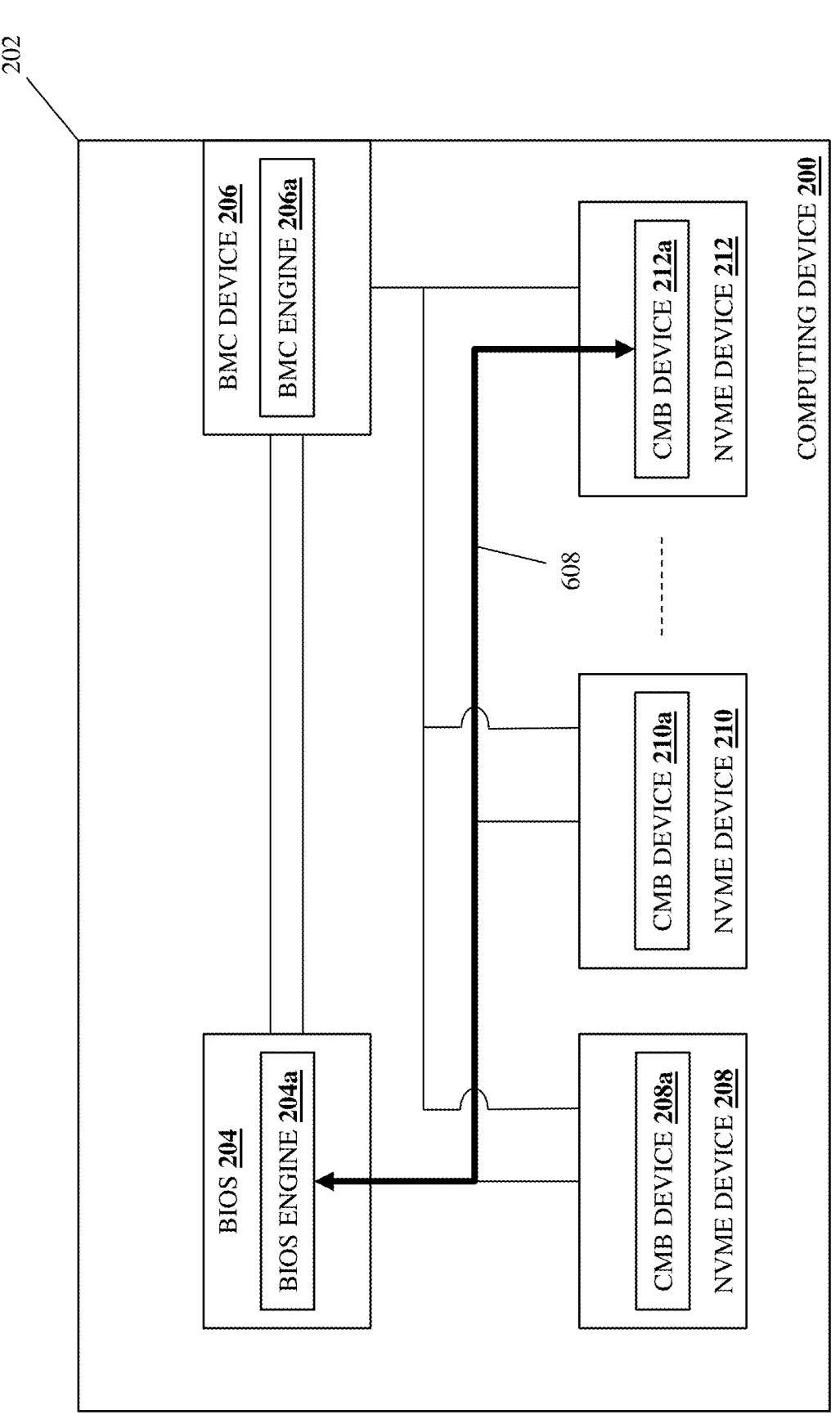
FIG. 6E is a schematic view illustrating an embodiment of the computing device of FIG. 2 operating during the method of FIG. 3.

If, at decision block 306b, the BIOS determines that a BMC response has not been provided in the CMB device (i.e., the BMC device has not retrieved the BMC command and provided the BMC response as described above), the method 300 returns to decision block 306b. With reference to FIG. 6E, the BIOS engine 204a in the BIOS 204 may be configured to perform BIOS polling operations 608 that include periodically accessing the CMB device 212a in the NVMe device 212 to determine whether a BMC response has been provided in the CMB device 212a (e.g., accessing the header of the CMB device 212a to determine whether an indication of a BMC response has been provided therein), and one of skill in the art in possession of the present disclosure will appreciate how the BIOS engine 204a may be configured to periodically perform the BIOS polling operations 608 at any frequency known in the art. Furthermore, one of skill in the art in possession of the present disclosure will appreciate how the BIOS polling operations 608 may be performed by the BIOS engine 204a throughout the method 300.

As such, BIOS polling operations 608 by the BIOS engine 204a that follow the provisioning of the BMC command in the CMB device 212a, but that are prior to the BMC engine 206a providing the BMC response in the CMB device 212a, will result in the BIOS engine 204a determining that no indication of the BMC response has been provided in the header of the CMB device 212a by the BMC engine 206a as described above, and thus that the BMC response has not been provided in the CMB device 212a. As such, decision block 306b of the method 300 may loop following the provisioning of the BMC command in the CMB device 212a until the BIOS engine 204a determines that a BMC response has been provided in the CMB device 212a. Furthermore, while not illustrated or described in detail, one of skill in the art in possession of the present disclosure will appreciate how the BIOS engine 204a may utilize a "polling timeout" or other mechanism that ends the BIOS polling operations 608 (and in some situations, provides for the re-provisioning of the BMC command in the CMB device 212a) if the BMC response has not been provided in the CMB device 212a in some maximum time period, number of polling operations, and/or other polling limit that would be apparent to one of skill in the art in possession of the present disclosure, following the provisioning of the BMC command in the CMB device 212a.

If, at decision block 306b, the BIOS determines that a BMC response has been provided in the CMB device, the method 300 proceeds to block 306c where the BIOS retrieves the BMC response from the CMB device during initialization. In an embodiment, BIOS polling operations 608 by the BIOS engine 204a that follow the provisioning of the BMC response in the CMB device 212a by the BMC engine 206a in the BMC device 206 will result in the BIOS engine 204a determining that an indication of the BMC response has been provided in the header of the CMB device 212a by the BMC engine 206a as described above, and thus that the BMC response has been provided in the CMB device 212a.

Figure 6F:
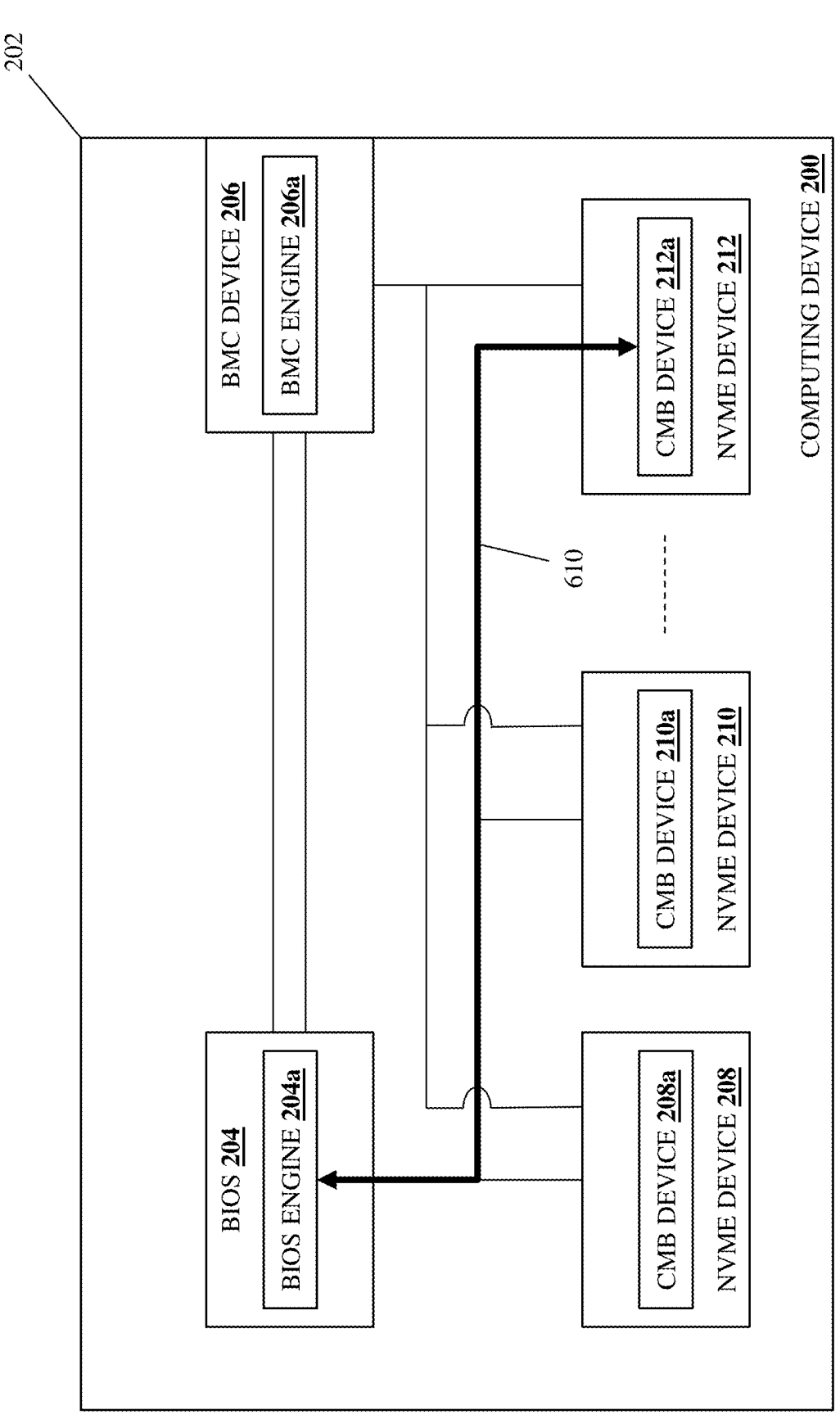
FIG. 6F is a schematic view illustrating an embodiment of the computing device of FIG. 2 operating during the method of FIG. 3.

With reference to FIG. 6F, in response to determining that the indication of the BMC response has been provided in the header of the CMB device 204a, the BIOS engine 204a may perform response retrieval operations 610 that include accessing the head/tail pointer structure for the BIOS/BMC completion queue in the CMB device 212a and determining that the tail portion of the head/tail pointer structure for the BIOS/BMC completion queue is greater than the head portion (e.g., the tail portion is "1" while the head portion is "0" as described above). In response to determining that the tail portion of the head/tail pointer structure for the BIOS/BMC completion queue is greater than the head portion, the BIOS engine 204a may retrieve the BMC response from the CMB device 212a, authenticate the BMC response, and increment a head portion of the head/tail pointer structure for the BIOS/BMC completion queue (e.g., from "0/1" to "1/1").

In examples in which the BMC command was a read command, the response retrieval operations 610 performed by the BIOS engine 204a in the BIOS 204 may include reading the data provided in the BMC response from the CMB device 212a. Similarly as described above for the BMC command and the BMC response, the retrieval of the BMC response from the CMB device 212a may include the BIOS engine 204a reading the BMC response from the BIOS/BMC completion queue in the CMB device 212a, incrementing a head portion of the head/tail pointer structure for the BIOS/BMC completion queue (e.g., from "0/1" to "1/1"), and/or any other response retrieval operations that would be apparent to one of skill in the art in possession of the present disclosure.

In examples in which the BMC command was a write command, the response retrieval operations 610 performed by the BIOS engine 204a in the BIOS 204 may include reading the confirmation from the CMB device 212a that the data provided in the BMC command was written. Similarly as described above for the BMC command and the BMC response, the retrieval of the BMC response from the CMB device 212a may include the BIOS engine 204a reading the BMC response from the BIOS/BMC completion queue in the CMB device 212a, incrementing a head portion of the head/tail pointer structure for the BIOS/BMC completion queue (e.g., from "0/1" to "1/1"), and/or any other response retrieval operations that would be apparent to one of skill in the art in possession of the present disclosure.

Loop 306 of the method 300 may then return to decision block 306a. As such, loop 306 of the method 300 may loop such that the BIOS may initiate communications with the BMC device during initialization operations for the computing device by providing BMC commands in the CMB device, with the BMC device responding by providing BMC responses in the CMB device, and the BIOS retrieving those BMC responses from the CMB device as described above, allowing the BIOS to read data "from" the BMC device, write data "to" the BMC device, and/or perform any other communications with the BMC device that would be apparent to one of skill in the art in possession of the present disclosure. As will be appreciated by one of skill in the art in possession of the present disclosure, loop 306 of the method 300 may continue throughout the initialization of the computing device 200, and may end once initialization of the computing device 200 is completed and an operating system takes over control of the computing device 200 during runtime of the computing device 200.

With reference now to loop 308, the method 300 may proceed to decision block 308a where the method 300 proceeds depending on whether the BMC device provides a BIOS command in the CMB device during initialization. As discussed below, the BMC engine 206a in the BMC device 206 may initiate communications with the BIOS 204 by generating a BIOS command (e.g., a read command directed to the BIOS 204, a write command directed to the BIOS 204, etc.), and providing that BIOS command in the CMB device 212a of the NVMe device 212. As such, decision block 308a will proceed depending on whether the BMC engine 206a provides a BIOS command in the CMB device 212a. If, at decision block 308a, the BMC device does not provide a BIOS command in the CMB device during initialization, loop 308 of the method 300 returns to decision block 308a. As such, loop 308 of the method 300 may loop until the BMC engine 206a provides a BIOS command in the CMB device 212a.

Figure 7A:
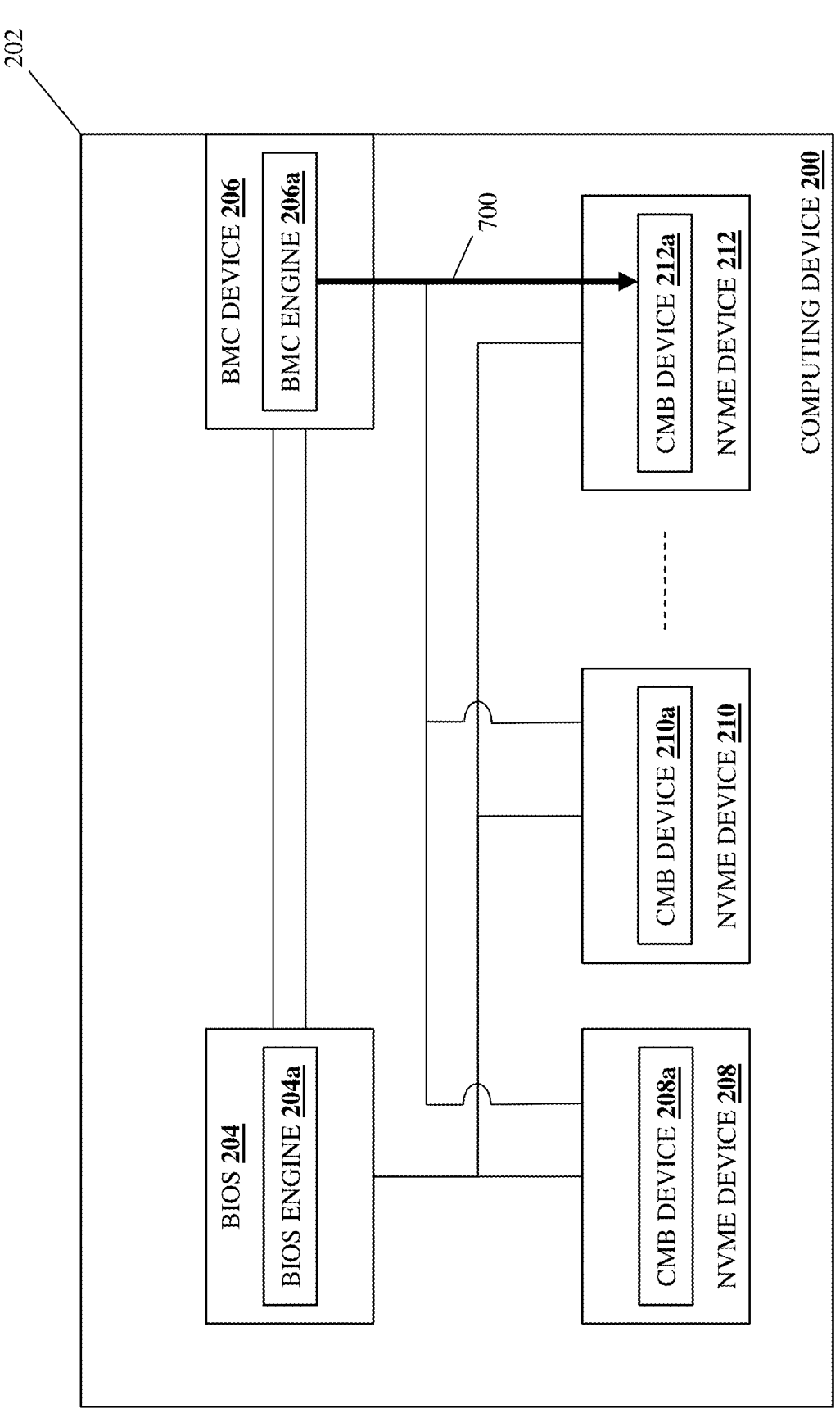
FIG. 7A is a schematic view illustrating an embodiment of the computing device of FIG. 2 operating during the method of FIG. 3.

Continuing with loop 308 of the method 300, if at decision block 308a the BMC device provides a BIOS command in the CMB device during initialization, the method 300 proceeds to decision block 308b where the BMC device determines whether a BIOS response has been provided in the CMB device. With reference to FIG. 7A, in an embodiment of decision block 308a, the BMC engine 206a in the BMC device 206 may perform BIOS command provisioning operations 700 that include generating the BIOS command (e.g., the read command directed to the BIOS 204, the write command directed to the BIOS 204, etc.) discussed above, and providing that BIOS command in the CMB device 212a of the NVMe device 212 as described above. For example, the provisioning of the BIOS command in the CMB device 212a by the BMC engine 206a may include the BMC engine 206a writing the BIOS command to the BMC/BIOS submission queue in the CMB device 212a, updating a header in the CMB device 212a to identify that the BIOS command has been written to the CMB device 212a, incrementing a tail portion of the head/tail pointer structure for the BMC/BIOS submission queue (e.g., from "0/0" to "0/1"), and/or performing any other command provisioning operations that would be apparent to one of skill in the art in possession of the present disclosure. While not described herein in detail, one of skill in the art in possession of the present disclosure will appreciate how the BMC engine 206a may provide the BIOS command in the CMB device 212a with authentication information (e.g., a signature or other authentication information known in the art) that may be authenticated by the BIOS engine 204a in order to ensure to the BIOS engine 204a that the BIOS command is from a trusted entity.

Figure 7B:
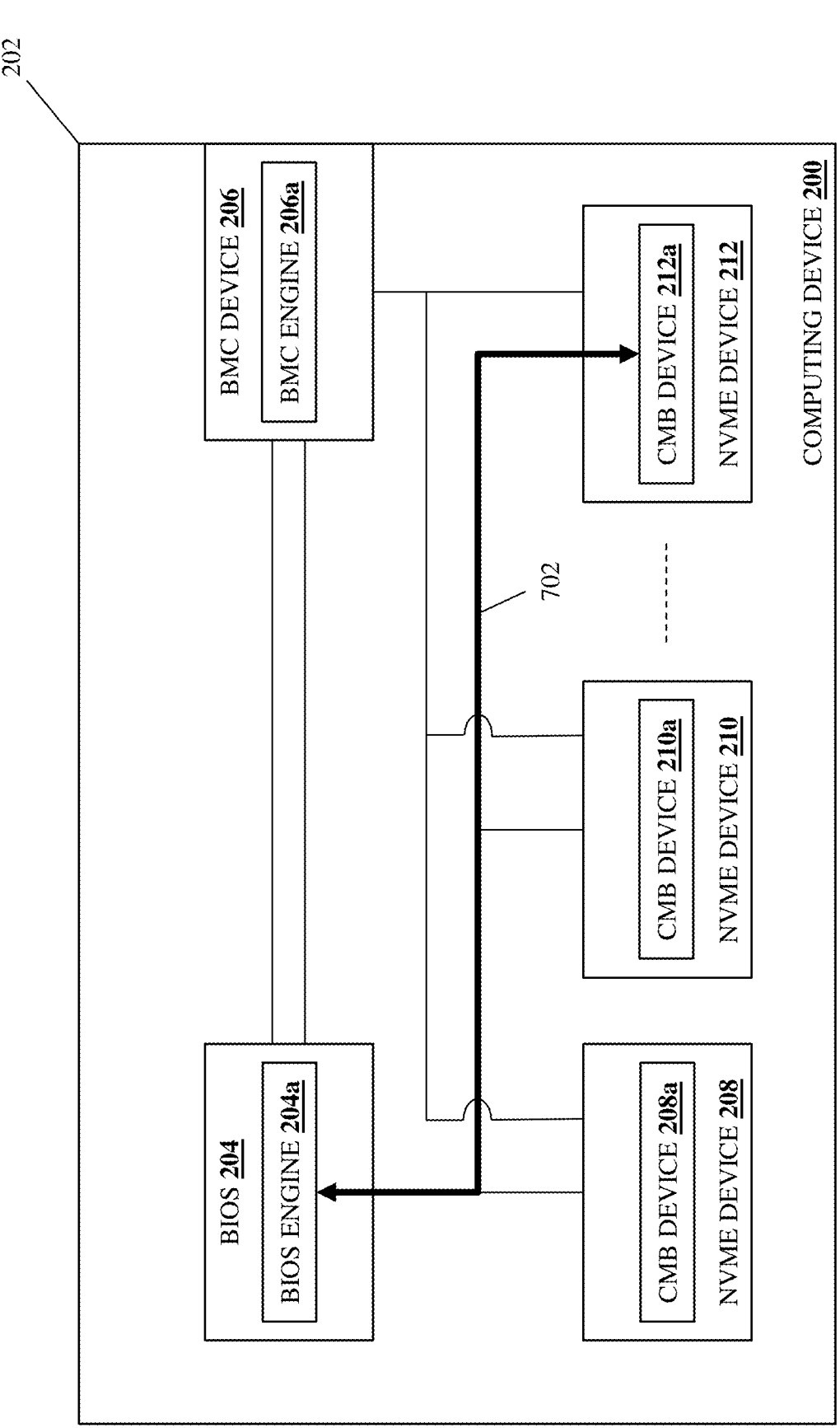
FIG. 7B is a schematic view illustrating an embodiment of the computing device of FIG. 2 operating during the method of FIG. 3.

Similarly as described above, with reference to FIG. 7B, the BIOS engine 204a in the BIOS 204 may be configured to perform BIOS polling operations 702 that include periodically accessing the CMB device 212a in the NVMe device 212 to determine whether a BIOS command has been provided in the CMB device 212a (e.g., accessing the header of the CMB device 212a to determine whether an indication of a BIOS command has been provided therein), and one of skill in the art in possession of the present disclosure will appreciate how the BIOS engine 204a may be configured to periodically perform the BIOS polling operations 702 at any frequency known in the art. Furthermore, one of skill in the art in possession of the present disclosure will appreciate how the BIOS polling operations 702 may be performed by the BIOS engine 204a throughout the method 300. As such, BIOS polling operations 702 by the BIOS engine 204a that follow the provisioning of the BIOS command in the CMB device 212a will result in the BIOS engine 204a determining that the indication of the BIOS command has been provided in the header of the CMB device 212a by the BMC engine 206a as described above.

Figure 7C:
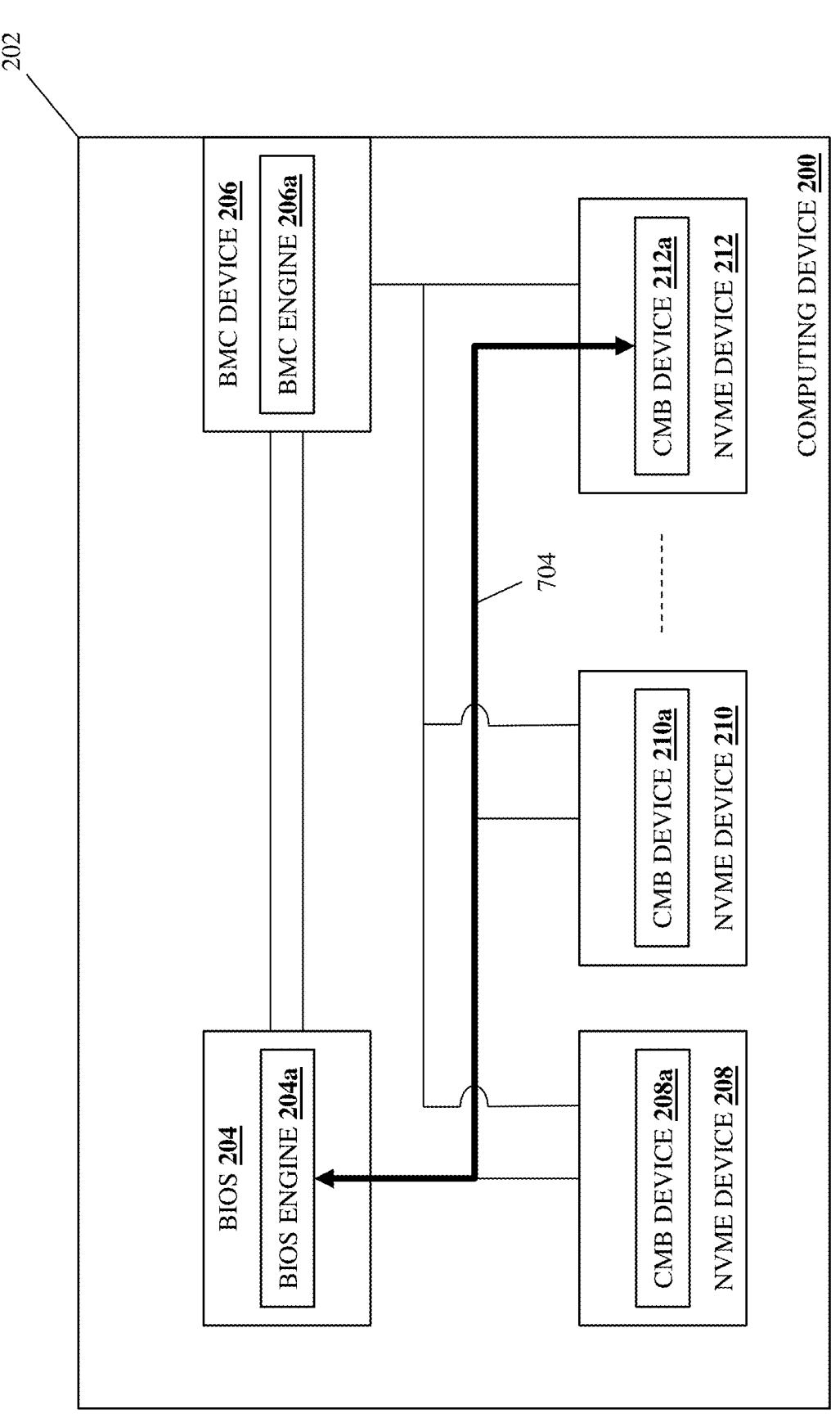
FIG. 7C is a schematic view illustrating an embodiment of the computing device of FIG. 2 operating during the method of FIG. 3.
Figure 7D:
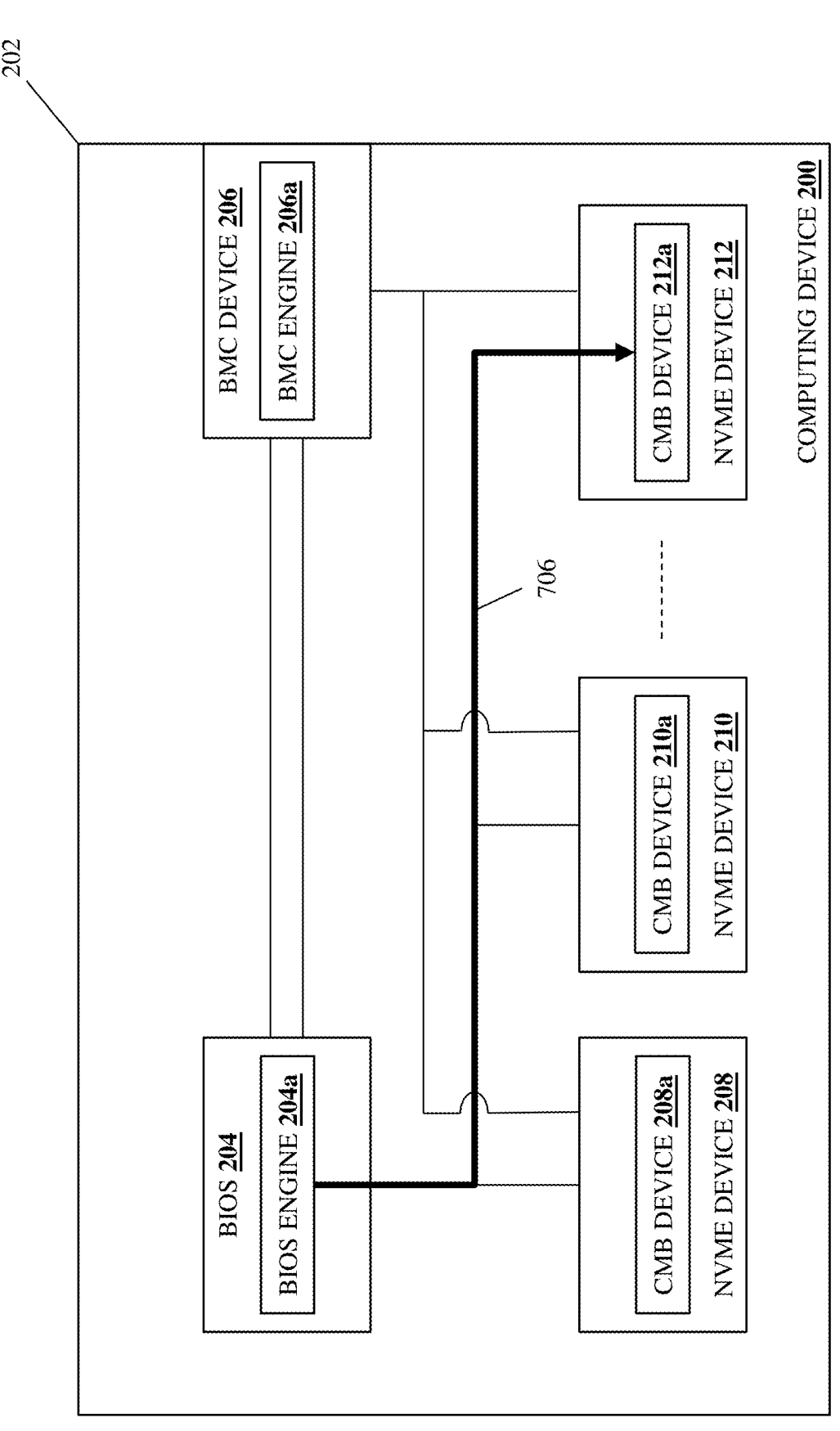
FIG. 7D is a schematic view illustrating an embodiment of the computing device of FIG. 2 operating during the method of FIG. 3.

With reference to FIG. 7C, in response determining that the indication of the BIOS command has been provided in the header of the CMB device 204a, the BIOS engine 204a may perform command retrieval operations 704 that include accessing the head/tail pointer structure for the BMC/BIOS submission queue in the CMB device 212a and determining that the tail portion of the head/tail pointer structure for the BMC/BIOS submission queue is greater than the head portion (e.g., the tail portion is "1" while the head portion is "0" as described above). In response to determining that the tail portion of the head/tail pointer structure for the BMC/BIOS submission queue is greater than the head portion, the BIOS engine 204a may retrieve the BIOS command from the CMB device 212a, authenticate the BIOS command, and increment a head portion of the head/tail pointer structure for the BMC/BIOS submission queue (e.g., from "0/1" to "1/1"). With reference to FIG. 7D, in response to retrieving the BIOS command from the CMB device 212a in the NVMe device 212, the BIOS engine 204a in the BIOS 204 may perform response provisioning operations 706 that include generating a BIOS response to the BIOS command, and providing that BIOS response in the CMB device 212a. While not described herein in detail, one of skill in the art in possession of the present disclosure will appreciate how the BIOS engine 204a may provide the BIOS response in the CMB device 212a with authentication information (e.g., a signature or other authentication information known in the art) that may be authenticated by the BMC engine 206a in order to ensure to the BMC engine 206a that the BIOS response is from a trusted entity.

In examples in which the BIOS command is a read command, the response provisioning operations 706 performed by the BIOS engine 204a in the BIOS 204 may include reading data requested in that read command from a memory device, storage device, and/or other data structure accessible to the BIOS engine 204a, generating a BIOS response that includes that data, and providing that BIOS response in the CMB device 212a. Similarly as described above for the BIOS command, the provisioning of the BIOS response in the CMB device 212a may include the BIOS engine 204a writing the BIOS response (including the data requested by the BMC engine 206a and read by the BIOS engine 204a as described above) to the BMC/BIOS completion queue in the CMB device 212a, updating a header in the CMB device 212a to identify that the BIOS response has been written to the CMB device 212a, incrementing a tail portion of the head/tail pointer structure for the BMC/BIOS completion queue (e.g., from "0/0" to "0/1"), and/or any other response provisioning operations that would be apparent to one of skill in the art in possession of the present disclosure.

In examples in which the BIOS command is a write command, the response provisioning operations 706 performed by the BIOS engine 204a in the BIOS 604 may include writing data provided in that write command to a memory device, storage device, and/or other data structure accessible to the BIOS engine 204a, generating a BIOS response that includes a confirmation that data has been written, and providing that BIOS response in the CMB device 212a. Similarly as described above for the BIOS command, the provisioning of the BIOS response in the CMB device 212a may include the BIOS engine 204a writing the BIOS response (including the confirmation that the data provided by the BMC engine 206a was written by the BIOS engine 204a as described above) to the BMC/BIOS completion queue in the CMB device 212a, updating a header in the CMB device 212a to identify that the BMC response has been written to the CMB device 212a, incrementing a tail portion of the head/tail pointer structure for the BMC/BIOS completion queue (e.g., from "0/0" to "0/1"), and/or any other response provisioning operations that would be apparent to one of skill in the art in possession of the present disclosure.

Figure 7E:
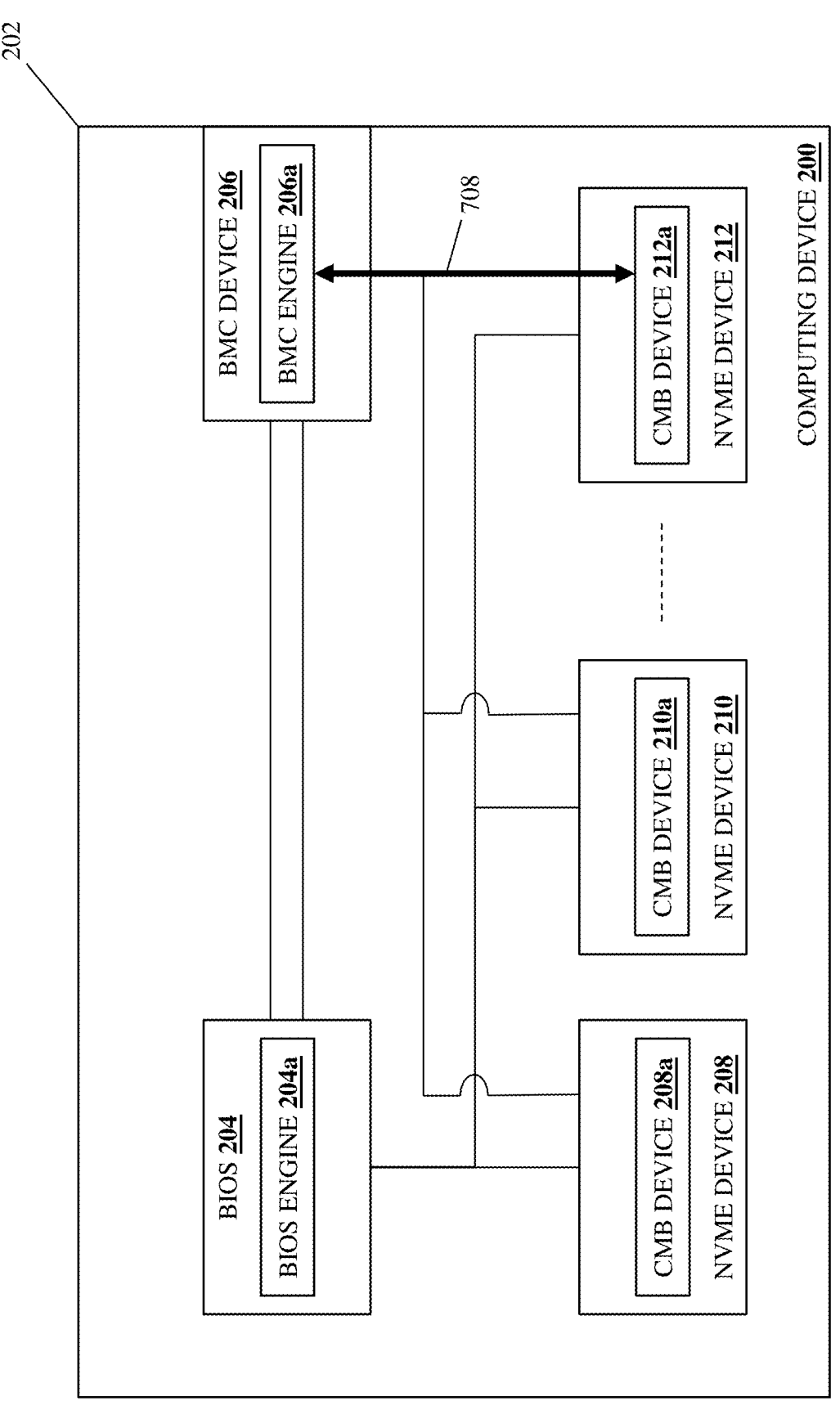
FIG. 7E is a schematic view illustrating an embodiment of the computing device of FIG. 2 operating during the method of FIG. 3.

If, at decision block 308b, the BMC device determines that a BIOS response has not been provided in the CMB device (i.e., the BIOS has not retrieved the BIOS command and provided the BIOS response as described above), the method 300 returns to decision block 308b. Similarly as described above, with reference to FIG. 7E, the BMC engine 206a in the BMC device 206 may be configured to perform BMC polling operations 708 that include periodically accessing the CMB device 212a in the NVMe device 212 to determine whether a BIOS response has been provided in the CMB device 212a (e.g., accessing the header of the CMB device 212a to determine whether an indication of a BIOS response has been provided therein), and one of skill in the art in possession of the present disclosure will appreciate how the BMC engine 206a may be configured to periodically perform the BMC polling operations 708 at any frequency known in the art. Furthermore, one of skill in the art in possession of the present disclosure will appreciate how the BMC polling operations 708 may be performed by the BMC engine 206a throughout the method 300.

As such, BMC polling operations 708 by the BMC engine 206a that follow the provisioning of the BIOS command in the CMB device 212a, but that are prior to the BIOS engine 204a providing the BIOS response in the CMB device 212a, will result in the BMC engine 206a determining that no indication of the BIOS response has been provided in the header of the CMB device 212a by the BIOS engine 204a as described above, and thus that the BIOS response has not been provided in the CMB device 212a. As such, decision block 308b of the method 300 may loop following the provisioning of the BIOS command in the CMB device 212a until the BMC engine 206a determines that a BIOS response has been provided in the CMB device 212a. Furthermore, while not illustrated or described in detail, one of skill in the art in possession of the present disclosure will appreciate how the BMC engine 206a may utilize a "polling timeout" or other mechanism that ends the BMC polling operations 708 (and in some situations, provides for the re-provisioning of the BIOS command in the CMB device 212a) if the BIOS response has not been provided in the CMB device 212a in some maximum time period, number of polling operations, and/or other polling limit that would be apparent to one of skill in the art in possession of the present disclosure following the provisioning of the BIOS command in the CMB device 212a.

If, at decision block 308b, the BMC device determines that a BIOS response has been provided in the CMB device, the method 300 proceeds to block 308c where the BMC device retrieves the BIOS response from the CMB device during initialization. In an embodiment, BMC polling operations 708 by the BMC engine 206a that follow the provisioning of the BIOS response in the CMB device 212a by the BIOS engine 204a in the BIOS 204 will result in the BMC engine 206a determining that an indication of the BIOS response has been provided in the header of the CMB device 212a by the BIOS engine 204a as described above, and thus that the BIOS response has been provided in the CMB device 212a.

Figure 7F:
FIG. 7F is a schematic view illustrating an embodiment of the computing device of FIG. 2 operating during the method of FIG. 3.

With reference to FIG. 7F, in response determining that the indication of the BIOS response has been provided in the header of the CMB device 204a, the BMC engine 206a may perform response retrieval operations 710 that include accessing the head/tail pointer structure for the BMC/BIOS completion queue in the CMB device 212a and determining that the tail portion of the head/tail pointer structure for the BMC/BIOS completion queue is greater than the head portion (e.g., the tail portion is "1" while the head portion is "0" as described above). In response to determining that the tail portion of the head/tail pointer structure for the BMC/BIOS completion queue is greater than the head portion, the BMC engine 206a may retrieve the BIOS response from the CMB device 212a, authenticate the BIOS response, and increment a head portion of the head/tail pointer structure for the BMC/BIOS completion queue (e.g., from "0/1" to "1/1").

In examples in which the BIOS command was a read command, the response retrieval operations 710 performed by the BMC engine 206a in the BMC device 206 may include reading the data provided in the BIOS response from the CMB device 212a. Similarly as described above for the BIOS command and the BIOS response, the retrieval of the BIOS response from the CMB device 212a may include the BMC engine 206a reading the BIOS response from the BMC/BIOS completion queue in the CMB device 212a, incrementing a head portion of the head/tail pointer structure for the BMC/BIOS completion queue (e.g., from "0/1" to "1/1"), and/or any other response retrieval operations that would be apparent to one of skill in the art in possession of the present disclosure.

In examples in which the BIOS command was a write command, the response retrieval operations 710 performed by the BMC engine 206a in the BMC device 206 may include reading the confirmation from the CMB device 212a that the data provided in the BIOS command was written. Similarly as described above for the BIOS command and the BIOS response, the retrieval of the BIOS response from the CMB device 212*a* may include the BMC engine 206*a* reading the BIOS response from the BMC/BIOS completion queue in the CMB device 212*a*, incrementing a head portion of the head/tail pointer structure for the BMC/BIOS completion queue (e.g., from "0/1" to "1/1"), and/or any other response retrieval operations that would be apparent to one of skill in the art in possession of the present disclosure.

Loop 308 of the method 300 may then return to decision block 308*a*. As such, loop 308 of the method 300 may loop such that the BMC device may initiate communications with the BIOS during initialization operations for the computing device by providing BIOS commands in the CMB device, with the BIOS responding by providing BIOS responses in the CMB device, and the BMC device retrieving those BIOS responses from the CMB device as described above, allowing the BMC device to read data "from" the BIOS, write data "to" the BIOS, and/or perform any other communications with the BIOS that would be apparent to one of skill in the art in possession of the present disclosure. As will be appreciated by one of skill in the art in possession of the present disclosure, loop 308 of the method 300 may continue throughout the initialization of the computing device 200, and may continue after initialization of the computing device 200 is completed and an operating system takes over control of the computing device 200 during runtime of the computing device.

As discussed above, while only a single CMB device (i.e., the CMB device 212*a* in the NVMe device 212) is illustrated and described as being used in the BIOS/BMC initialization communication system of the present disclosure, other CMB devices (e.g., the CMB devices 208*a* and/or 210*a* in the NVMe devices 208 and/or 210, respectively) may be utilized to provide redundancy and/or failover. For example, the CMB device 210*a* in the NVMe device 210 may be configured as a "failover CMB device" such that it is used for the BIOS/BMC initialization communications described above in the event the CMB device 212*a* in the NVMe device 212 becomes unavailable (e.g., if the NVMe device 212 is "hot-removed" from the computing device 200). In another example, the CMB device 210*a* in the NVMe device 210 may be configured as a "redundant CMB device" such that any of the BIOS/BMC initialization communications or related information provided in the CMB device 212*a* as described above are mirrored in the CMB device 210*a* in the NVMe device 210, and may be utilized to continue BIOS/BMC initialization communications in the event the CMB device 212*a* becomes unavailable (e.g., if the NVMe device 212 is "hot-removed" from the computing device 200). Furthermore, in the event no CMB devices are available for the BIOS/BMC initialization communications as described above, the BIOS engine 204*a* in the BMC device 204 and the BMC engine 206*a* in the BMC device 206 may utilize their PBI communication subsystem in order to perform conventional BIOS/BMC initialization communications.

Thus, systems and methods have been described that enable communications between a BIOS and a BMC device in a computing device during its initialization using a controller memory buffer device in a storage device in that computing device. For example, the BIOS/BMC initialization communication system of the present disclosure may include a storage device having a controller memory buffer device, a BMC device coupled to the storage device, and a BIOS coupled to the storage device. During initialization operations, the BIOS configures the controller memory buffer device for BIOS/BMC communications, and transmits controller memory buffer device utilization information for the controller memory buffer device to the BMC device. The BIOS may then communicate with the BMC device during initialization operations by providing a BMC command in the controller memory buffer device, determining that the BMC device has provided a BMC response in the controller memory buffer device, and retrieving the BMC response. Similarly, the BMC device may communicate with the BIOS during initialization operations by providing a BIOS command in the controller memory buffer device, determining that the BIOS has provided a BIOS response in the controller memory buffer device, and retrieving the BIOS response.

As such, the issues with conventional initialization communications via the PBI communication subsystem in the BMC device of a computing device discussed above are eliminated. For example, one of skill in the art in possession of the present disclosure will appreciate how the issues associated with the relatively limited memory buffer capacity of PBI communication subsystems that often requires multiple sequential initialization communication transactions for relatively large data packets and introduces an initialization communications bottleneck that impacts the time required to initialize the server device may be eliminated, as the CMB devices utilized in the storage devices of the present disclosure may be provided with a relatively larger capacity that may be increased as needed. Furthermore, one of skill in the art in possession of the present disclosure will also appreciate how the issues associated with the need for the BMC to be available in order for its PBI communication subsystem to be used are eliminated, as BMC commands may be provided in the CMB device by the BIOS even when the BMC device is unavailable, and may be retrieved by the BMC device once it becomes available. Further still, one of skill in the art in possession of the present disclosure will appreciate how the issues associated with the relatively "tight binding" of PBI communication subsystems to their server device platforms (e.g., to the hardware in the BMC) that requires the source code of the BIOS to be changed in each server device platform generation are eliminated, as the CMB devices in the storage devices of the present disclosure are not bound to the server device platform/BMC hardware.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Basic Input/Output System (BIOS)/Baseboard Management Controller (BMC) initialization communication system, comprising:

a storage device that includes a controller memory buffer device;

a Baseboard Management Controller (BMC) device that is coupled to the storage device;

a Basic Input/Output System (BIOS) that is coupled to the storage device and that is configured, during initialization operations, to:

configure the controller memory buffer device for BIOS/BMC communications;

transmit controller memory buffer device utilization information for the controller memory buffer device to the BMC device;

provide, in the controller memory buffer device, a BMC command;

determine that the BMC device has provided a BMC response to the BMC command in the controller memory buffer device; and retrieve, in response to determining that the BMC device has provided the BMC response to the BMC command in the controller memory buffer device, the BMC response.

2. The system of claim 1, wherein the configuring the controller memory buffer device for BIOS/BMC communications includes:

setting a register in the storage device to indicate an intent to use the controller memory buffer device.

3. The system of claim 1, wherein the BIOS is configured, during the initialization operations, to:

retrieve the controller memory buffer device utilization information from the controller memory buffer device.

4. The system of claim 1, wherein the controller memory buffer device utilization information for the controller memory buffer device is transmitted to the BMC device via an Intelligent Platform Management Interface (IPMI) communication subsystem.

5. The system of claim 1, wherein the configuring the controller memory buffer device for BIOS/BMC communications includes:

configuring the controller memory buffer device with a BIOS/BMC submission queue that is configured to store the BMC request and a BIOS/BMC completion queue that is configured to store the BMC response.

6. The system of claim 1, wherein the providing the BMC command in the controller memory buffer device includes:

providing a BMC command indicator in a header of the controller memory buffer device.

7. The system of claim 1, wherein the BMC device is configured to:

provide, in the controller memory buffer device, a BIOS command;

determine that the BIOS has provided a BIOS response to the BIOS command in the controller memory buffer device; and retrieve, in response to determining that the BIOS has provided the BIOS response to the BIOS command in the controller memory buffer device, the BIOS response.

8. An Information Handling System (IHS), comprising:

a processing system; and a memory system that is coupled to the processing system and that includes instructions that, when executed by the processing system, cause the processing system to provide a Basic Input/Output System (BIOS) engine that is configured, during initialization operations, to:

configure, for BIOS/BMC communications, a controller memory buffer device in a storage device that is coupled to the processing system;

transmit controller memory buffer device utilization information for the controller memory buffer device to a BMC device that is coupled to the processing system;

provide, in the controller memory buffer device, a BMC command;

determine that the BMC device has provided a BMC response to the BMC command in the controller memory buffer device; and retrieve, in response to determining that the BMC device has provided the BMC response to the BMC command in the controller memory buffer device, the BMC response.

9. The IHS of claim 8, wherein the configuring the controller memory buffer device for BIOS/BMC communications includes:

setting a register in the storage device to indicate an intent to use the controller memory buffer device.

10. The IHS of claim 8, wherein the BIOS engine is configured, during the initialization operations, to:

retrieve the controller memory buffer device utilization information from the controller memory buffer device.

11. The IHS of claim 8, wherein the controller memory buffer device utilization information for the controller memory buffer device is transmitted to the BMC device via an Intelligent Platform Management Interface (IPMI) subsystem.

12. The IHS of claim 8, wherein the configuring the controller memory buffer device for BIOS/BMC communications includes:

configuring the controller memory buffer device with a BIOS/BMC submission queue that is configured to store the BMC request and a BIOS/BMC completion queue that is configured to store the BMC response.

13. The IHS of claim 8, wherein the providing the BMC command in the controller memory buffer device includes:

providing a BMC command indicator in a header of the controller memory buffer device.

14. A method for Basic Input/Output System (BIOS)/Baseboard Management Controller (BMC) communication during initialization of a computing device, comprising:

configuring, by a Basic Input/Output System (BIOS) during initialization operations, a controller memory buffer device in a storage device for BIOS/BMC communications;

transmitting, by the BIOS during the initialization operations, controller memory buffer device utilization information for the controller memory buffer device to a BMC device;

providing, by the BIOS in the controller memory buffer device during the initialization operations, a BMC command;

determining, by the BIOS during the initialization operations, that the BMC device has provided a BMC response to the BMC command in the controller memory buffer device; and retrieving, by the BIOS during the initialization operations in response to determining that the BMC device has provided the BMC response to the BMC command in the controller memory buffer device, the BMC response.

15. The method of claim 14, wherein the configuring the controller memory buffer device for BIOS/BMC communications includes:

setting a register in the storage device to indicate an intent to use the controller memory buffer device.

16. The method of claim 14, further comprising:

retrieving, by the BIOS during the initialization operations, the controller memory buffer device utilization information from the controller memory buffer device.

17. The method of claim 14, wherein the controller memory buffer device utilization information for the controller memory buffer device is transmitted to the BMC device via an Intelligent Platform Management Interface (IPMI) subsystem.

18. The method of claim 14, wherein the configuring the controller memory buffer device for BIOS/BMC communications includes:

configuring the controller memory buffer device with a BIOS/BMC submission queue that is configured to store the BMC request and a BIOS/BMC completion queue that is configured to store the BMC response.

19. The method of claim 14, wherein the providing the BMC command in the controller memory buffer device includes:

providing a BMC command indicator in a header of the controller memory buffer device.

20. The method of claim 14, further comprising:

providing, by the BMC device in the controller memory buffer device during the initialization operations, a BIOS command;

determining, by the BMC device during the initialization operations, that the BIOS has provided a BIOS response to the BIOS command in the controller memory buffer device; and retrieving, by the BMC device during the initialization operations in response to determining that the BIOS has provided the BIOS response to the BIOS command in the controller memory buffer device, the BIOS response.

* * * * *